Jan. 3, 1967 R. L. CORBIN 3,295,167
APPARATUS FOR PRESSING COMPOSITE CONSOLIDATED ARTICLES
Original Filed April 22, 1963 2 Sheets-Sheet 1

INVENTOR.
ROBERT L. CORBIN
BY Leslie G. Nollen
Daniel C. Block
ATTORNEYS

Jan. 3, 1967   R. L. CORBIN   3,295,167
APPARATUS FOR PRESSING COMPOSITE CONSOLIDATED ARTICLES
Original Filed April 22, 1963   2 Sheets-Sheet 2
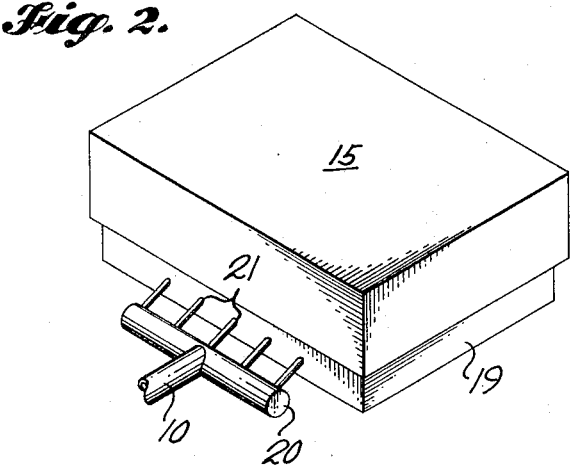
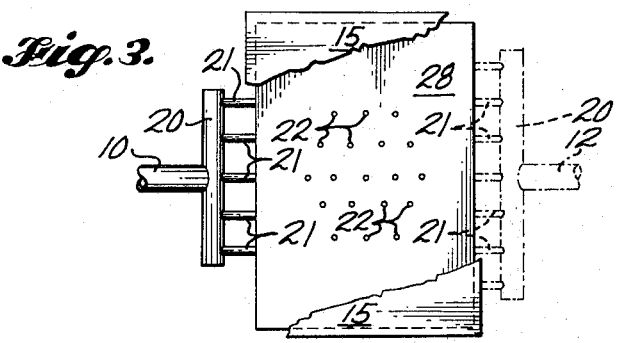
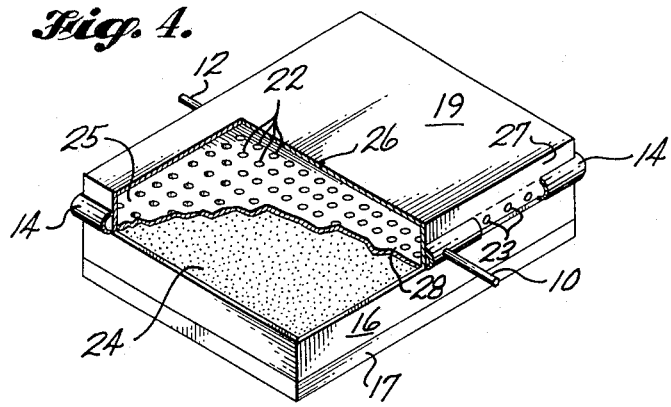
INVENTOR.
ROBERT L. CORBIN
BY
ATTORNEYS องTHE # United States Patent Office 3,295,167
Patented Jan. 3, 1967

3,295,167
APPARATUS FOR PRESSING COMPOSITE
CONSOLIDATED ARTICLES
Robert L. Corbin, Longview, Wash., assignor to Weyerhaeuser Company, Tacoma, Wash., a corporation of Washington
Original application Apr. 22, 1963, Ser. No. 274,594. Divided and this application Dec. 13, 1965, Ser. No. 528,670
2 Claims. (Cl. 18—17)

This application is a division of my copending application Serial No. 274,594 filed April 22, 1963, entitled "Method of and Apparatus for Pressing Composite Consolidated Articles."

This invention relates to an apparatus for pressing composite wood products. More specifically, this invention relates to an apparatus for reducing the time-in-press for composite wood products.

In the art of forming composite wood panels, it is the practice to spray a suitable resin to lignocellulosic or wood particles and then press a mat formed of the constituents into the composite panel. Heat is introduced into the panel by conduction while pressing the panel to cure the resin binder. This procedure is slow since it takes many minutes to complete the panel formation and cure the resin. This is particularly true for thick boards whose consolidation by conduction pressing may be precluded by the inability to cure the resin in the center of the mat.

In order to speed up this process, it has been proposed to increase the pressures and platen temperature which conducts heat to the panel. However, these factors have been extended to the greatest practical degree, but have only slightly reduced the press time for forming the composite panel. Moreover, any further extension of these factors would result in board or panel burning, precure of surface resin, intolerable density variations and general board or panel failure or rupture at the end of the pressing cycle.

Further attempts have been made to reduce the panel press time by introducing steam into the mat during pressing. This is brought about by providing slits or holes in the press platens. The purpose of the steam is to employ the heat of condensation and introduce moisture into the mat. The introduced steam would elasticize the lignocellulose material which facilitates more rapid pressing of the panel and more uniform densities.

This type of system has been unsuccessful because a temperature of above 212° F. cannot be reached within a reasonable length of time, thus eliminating many binders, such as phenolic resins, which require higher curing temperatures to be most effective. Moreover, the moisture, once introduced, must be removed before good board or panel consolidation results. The moisture may be removed by drying the mat with heat conducted from the press platens or by evacuation methods. Both procedures result in higher cost of forming the panels because drying the mat requires longer press time and evacuation procedures involve complex closed systems.

An object of this invention is to provide an apparatus for forming composite panels with a reduced time-in-press operation.

Another object of this invention is to provide an apparatus for quickly raising the temperature of a composite mat throughout its thickness without increasing the moisture content of the mat.

Another object of this invention is to provide an apparatus for uniformly heating the composite mat with a high temperature gas which reduces the time-in-press for forming a composite panel.

These and other objects and advantages will become manifestly clear to those skilled in the art when taken in conjunction with the detailed description and drawings, wherein:

FIGURE 2 is a perspective view of the upper press platen.

FIGURE 3 is a top plan view of the upper platen with portions broken away to show internal details.

FIGURE 4 is a perspective view of another type of platen with portions thereof cut away to show internal details.

Figure 1:
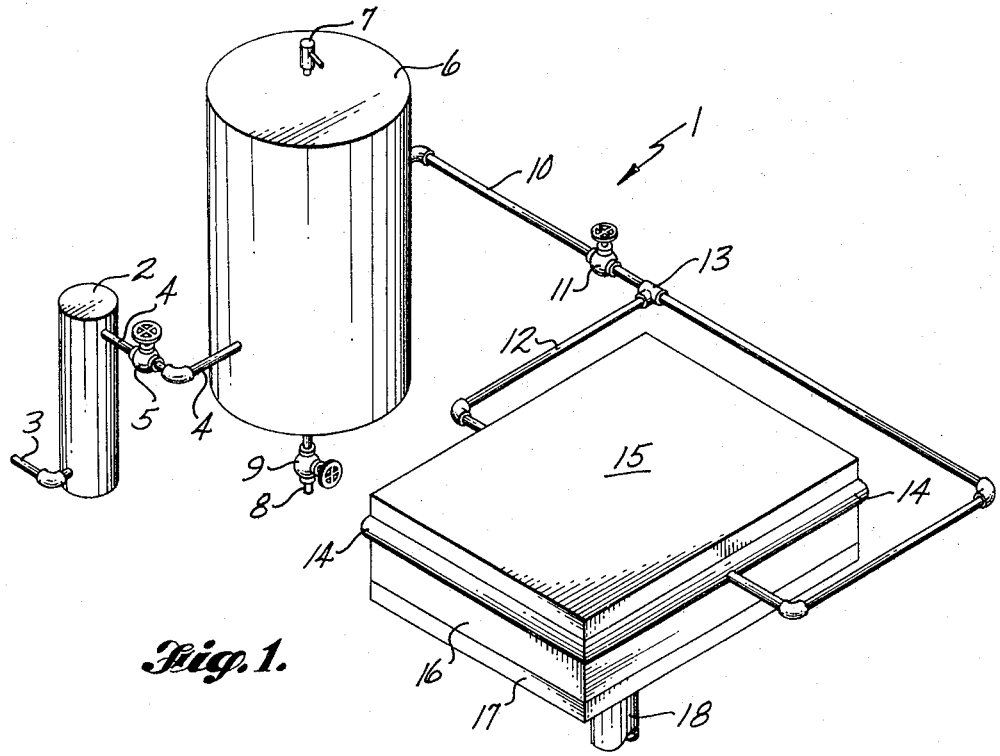
FIGURE 1 is a perspective view of the over-all layout of the apparatus used to press the composite panels.

Referring now to the drawings, the steam press assembly is generally indicated at 1 and comprises a superheater 2 connected to a source of steam, not shown, by pipe 3. The superheater 2 is composed of the usual insulated structural tank and a heating means, not shown, to superheat the steam. Extending from the superheater 2 to a storage tank 6 is a pipe 4 having a valve 5 therein.

The storage tank 6 is provided with the usual insulating and heating means, not shown, to maintain the degrees of superheat added to the steam in the superheater 2. The upper end of the tank 6 is provided with a safety poppet valve 7 to insure safe conditions. The lower end of the tank 6 is provided with the usual exhaust pipe 8 having a valve 9 therein.

The tank 6 is connected to a conduit or pipe 10 having a valve 11 therein. The pipe 10 has a T-connection 13 which is connected to a branch pipe 12. The outer ends of the pipe 10 and the branch pipe 12 are connected to a header structure 14 mounted on upper heated platen 15. The header 14 extends around the entire periphery of the platen 15.

Below the heated platen 15 is another heated platen 17 having a ram arm 18 connected thereto for the purpose of pressing a mat 16 between the upper and lower platens. The arm 18 is connected to a hydraulic system, not shown, which extends the arm 18 upwardly and downwardly.

In this manner, the superheated steam stored in the tank 6 can be injected into the mat 16 through the pipes 10 and 12. The upper platen 15 has connected thereto a steam chamber or platen, not shown in FIGURE 1, that has communication with the header 14.

Referring now to FIGURE 2, another type of steam apparatus is shown. This steam apparatus is similar to the one shown in FIGURE 1 except that a different type of header is employed. The header 20 is in the form of an elongated pipe member having a plurality of conduits 21 communicating the header 20 with the interior of the steam platen 19. The bottom surface of the steam platen 19 is provided with a plurality of openings 22 therein so that superheated steam can be injected into the mat 16. The holes 22 through the bottom plate 28 of steam platen 19 serve to diffuse the steam and distribute the superheated steam evenly throughout the mat 16.

Referring now to FIGURE 4, another type of steaming platen is disclosed. In this embodiment the steaming platen 19 is provided with a sintered metal plate 24 bolted to the lower surface thereof. The sintered metal plate 24 provides a plurality of minute passages therethrough which allows the superheated steam to be conducted through it. As shown, the member 19 is provided with an upper wall 26, side walls 27 and lower wall 28 having the openings 22 therein. The upper wall 26 and lower wall 28 and side walls 27 delineate a chamber 25 which communicates with header 17 by the openings 23 through the side wall 27.

Accordingly, when a mat 16 is placed between the lower platen 17 and upper steam platen 19, the steam injected into the header 17 will be distributed evenly throughout the mat 16, since the holes 22 are evenly distributed through the lower surface of the bottom plate 28 of chamber 25. Also, the steam must go through the sintered metal plate 24 which serves to diffuse the steam even more and uniformly distribute it throughout the mat 16.

The finished product or panel 16 of this embodiment will be provided with a smoother surface then would be provided if the sintered plate 24 were not used.

A variety of comminuted cellulose materials may be used as starting materials in forming the mat 16. Although suitable materials include sawdust, shavings, flakes, wood flour, and various chemically produced cellulose pulps, it is preferred to employ defiberized lignocellulose. This may be derived from any suitable source such as cane, straw, the bark of trees, and the like, but preferably it is derived from the wood of trees of various species.

The resinous binder used to bind the wood particles together may be any suitable thermosetting resin, but preferably it is either urea-formaldehyde or phenol-formaldehyde resins. The particular binder employed will be determined by the properties of strength, hardness, surface qualities, etc. desired in the finished panel.

In general, this product is manufactured by the process of the following outline in which wood is used as an example of the starting material.

Step 1. Obtaining comminuted wood in the form of mechanical or chemical fiber, wood planer mill shavings, sawdust or manufactured flakes.

Step 2. Preparation of the natural lignocellulosic furnish by further mechanical or chemical action, size classification and drying.

Step 3. Adding the selected thermosetting resin or resins to bind the particles. This may be done at any one of many points in the process.

Step 4. Felting the particles into a thick, low density mat.

Step 5. Predensifying the mat to facilitate handling.

When it is desired to form the mat 16 into a finished panel product, the following process is followed:

The superheater 2 is connected to a suitable source of steam, not shown, by the pipe 3. The proper amount of superheat is then added to the steam and conveyed to the tank 6 by the pipe 4 and valve 5. The amount of superheat added by the superheater 2 may vary from 50° to 450° of superheat. A heating assembly in tank 6, not shown, is then activated in order to maintain the temperature of the superheated steam stored in tank 6 at the level to which it was raised in the superheater 2.

The mat 16 is then placed onto the lower platen member 17. The ram arm 18 is raised by the hydraulic motor, not shown, to bring the mat within the proximity of the upper steam platen 19. It should be noted that the upper heated platen 15 and the lower heated platen 17 may be steam heated. The upper and lower platens 15 and 17 may be heated up to 400° F.

The lower platen 17 is then raised to compress the mat 16 for approximately 1 to 60 seconds at a pressure range of 50 to 1,000 p.s.i. As the mat 16 is compressed, the resistance of the mat 16 will stop the lower platen 17 prior to obtaining the desired thickness. With the pressure of the lower platen 17 on the mat 16, the valve 11 is opened and superheated steam under a pressure of from 50 to 150 p.s.i. with approximately 50° to 450° of superheat flows through the small holes 22 in the bottom plate 28 of steam platen 19. As the superheated steam flows through mat 16, it is plasticized which allows the lower platen 17 to continue closing to the desired thickness. The superheated steam is allowed to flow into the mat from 1 to 30 seconds. Then, the valve 11 is closed. After from about 15 to 300 seconds, total time, the mat 16 is removed from the lower platen and a completely cured and consolidated board or panel is formed. The superheated steam used from tank 6 is replenished with a new supply of steam from superheater 2 by opening valve 5.

It should be noted that the superheated steam that is fed into the perforated plate by the header 14 is allowed to escape into the mat and out the edges thereof. With this process in practice, above normal temperatures are maintained in the platens and a high degree of superheat in the steam. A most successful panel can be made by keeping a short steam induction period. Moreover, the deleterious effect of high platen temperatures normally used in conventional processes is eliminated by the short press period achieved by this method. Since a high degree of superheat is maintained and the platen temperatures are high, the steam is not allowed to condense into the mat and thus form moisture which must thereafter be removed. The internal mat temperature is raised rapidly by heat transfer from the superheated steam. The high platen temperatures serve to maintain this temperature level and additional steaming is not required.

In order to explain the effects achieved by this process, the mechanism postulated is a convection rather than conduction heat transfer. The superheated steam does not condense, no latent heat of vaporization is used, and the steam front passes through the mat from the centers to the edges, heating the mat elements solely by convection.

The process involved in using the apparatus of the present invention can be further illustrated by the following example:

EXAMPLE I

Douglas fir particles were sprayed with a urea-formaldehyde resin and formed in a forming box. The particles were cold pressed to form a mat that could be handled. The moisture content of the mat was 8% as it entered the press. The platens were heated to 400° F. The steam platen contained 3/32" holes spaced 2" apart. To the steam platen was attached a steam line from a superheater. The mat was compressed at 300 p.s.i. for 30 seconds. Then the valve 11 was opened and 50 p.s.i. steam with 300° F. of superheat was allowed to pass through the small holes 22 in the steam platen and into the mat. After 5 seconds the valve was closed. The internal mat temperature raised from 70° F. to 330° F. in 2 seconds and the press was then further closed. The heating was accomplished without increase in mat weight. After 120 seconds, (total time) a 3/4", 41 pounds per cu. ft. board was removed, completely cured and consolidated.

It should be noted that with this invention, dry steam is used to convect heat into the mat 16. The heat and heat alone is used to aid the consolidation of the mat by plasticization of the lignocellulosic material and to cure the thermosetting binders which are used. The steam and displaced air are evacuated by flowing out the edges of the mat since a pressure differential is created by using high steam injection pressures for short durations. By raising the internal mat temperature rapidly, as noted above, the heat from the superheated steam plasticizes the lignocellulose material which is then compressed more rapidly and more uniformly than can be achieved with conventional methods using ordinary steam.

While specific details of a preferred embodiment have been set forth above, it will be apparent that many changes and modifications may be made, such as, providing channeled or plenums steam platens without departing from the spirit of the invention. It will therefore be understood that what has been described herein is intended to be illustrative only, and is not intended to limit the scope of the invention.

What is claimed is:

1. A steaming apparatus for consolidating composite hardboards or panels formed of lignocellulosic material bound together with a thermosetting resin binder, comprising the combination of: means providing a source of superheated steam; upper and lower heated press platens adapted to receive said material to be consolidated; one of said press platens being movable toward the other to press said material between said upper and lower press platens; said press platens when in a closed position being spaced so as to provide an opening between the lateral edges thereof; a steam platen mounted on one of said platens having a steam chamber; said steam platen being provided with a plurality of spaced openings communicating said chamber with said material between said upper and lower platens; header means extending around the entire periphery of said steam platen and in fluid communication with said steam chamber; and conduit means having a valve therein communicating said header means with said superheated steam source whereby superheated steam can flow through said conduit means, header means, steam platen and into said material between said upper and lower platens, and from said material through the lateral edges thereof.

2. The steaming apparatus as set forth in claim 1, wherein a sintered metal plate is fixed to the steam platen in such a manner that the superheated steam must flow through the sintered metal plate from said steam chamber and into said material to be consolidated.

References Cited by the Examiner
UNITED STATES PATENTS

| | | | |
|---|---|---|---|
| 2,250,697 | 7/1941 | Bassett | 18—5 X |
| 2,331,126 | 10/1943 | Loomis. | |
| 2,821,747 | 2/1958 | Rossiter | 18—17 X |
| 2,900,664 | 8/1959 | Hampel et al. | |
| 2,948,926 | 8/1960 | Kühn. | |
| 3,152,364 | 10/1964 | Alm | 18—18 X |

J. SPENCER OVERHOLSER, *Primary Examiner.*

J. HOWARD FLINT, JR., *Examiner.*